(12) United States Patent
Zinger et al.

(10) Patent No.: US 11,010,274 B2
(45) Date of Patent: May 18, 2021

(54) METHOD AND APPARATUS FOR TRACE DATA COLLECTION

(71) Applicant: EMC IP Holding Company LLC, Hopkinton, MA (US)

(72) Inventors: Eldad Zinger, Raanana (IL); Eyal Harari, Herzliya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 16/049,098

(22) Filed: Jul. 30, 2018

(65) Prior Publication Data

US 2020/0034274 A1 Jan. 30, 2020

(51) Int. Cl.
*G06F 11/36* (2006.01)
*G06F 12/06* (2006.01)

(52) U.S. Cl.
CPC .......... *G06F 11/3636* (2013.01); *G06F 12/06* (2013.01); *G06F 2212/1041* (2013.01)

(58) Field of Classification Search
CPC ............ G06F 11/3688; G06F 11/3684; G06F 11/3664; G06F 11/3692; G06F 11/3636; G06F 11/3612; G06F 11/3672; G06F 11/079; G06F 2201/865; G06F 11/368; G06F 11/0751; G06F 11/3616; G06F 11/3676

See application file for complete search history.

(56) References Cited

U.S. PATENT DOCUMENTS

| | | | | |
|---|---|---|---|---|
| 6,243,836 B1* | 6/2001 | Whalen | .................... | G06F 11/25 714/39 |
| 6,453,405 B1* | 9/2002 | Hoyle | ................. | G06F 9/30036 711/110 |
| 6,539,341 B1* | 3/2003 | Li | ...................... | G01R 31/3172 702/182 |
| 8,619,772 B2* | 12/2013 | Dyke | .................... | H04L 43/026 370/389 |
| 9,378,059 B2* | 6/2016 | Huetter | .................... | G06F 9/544 |
| 10,067,741 B1* | 9/2018 | Khan | ...................... | G06F 5/085 |
| 10,423,358 B1* | 9/2019 | Foo | ......................... | G06F 3/0643 |
| 10,474,518 B1* | 11/2019 | Rupavatharam | .... | G06F 11/0778 |
| 2010/0312985 A1* | 12/2010 | Rostedt | ............... | G06F 11/3636 711/206 |
| 2014/0269276 A1* | 9/2014 | Rothstein | ............ | H04L 43/0894 370/230 |
| 2015/0039840 A1* | 2/2015 | Chandra | ................. | G06F 12/00 711/147 |
| 2016/0246544 A1* | 8/2016 | Nicol | ................... | G06F 12/0802 |
| 2018/0181503 A1* | 6/2018 | Nicol | ...................... | G06F 15/17 |

* cited by examiner

*Primary Examiner* — Amine Riad
(74) *Attorney, Agent, or Firm* — Daly, Crowley, Mofford & Durkee, LLP

(57) ABSTRACT

A method is provided for collecting trace data items generated by a plurality of trace points, the method comprising: allocating a ring buffer in a first memory, the ring buffer including a plurality of trace buffers; when any of the trace points is executed, storing a trace data item generated by the trace point in one of the plurality of trace buffers that is identified by a given value of a ring pointer; retrieving the trace data item from the trace buffer based on at least one of: (i) a first timestamp that is generated when the trace data item is stored in the trace buffer, and (ii) a second timestamp indicating a time when the ring pointer was assigned the given value; and storing the retrieved trace data item in a second memory device.

8 Claims, 10 Drawing Sheets

| | RING POINTER VALUE | TIME WHEN THE RING POINTER WAS ASSIGNED THE VALUE |
|---|---|---|
| 410A | 202a | $t_1$ |
| 410B | 202b | $t_2$ |
| 410C | 202c | $t_3$ |
| 410D | 202d | $t_4$ |
| 410E | 202e | $t_5$ |
| 410F | 202f | $t_6$ |
| 410G | 202g | $t_7$ |
| 410H | 202h | $t_8$ |
| 410I | 202a | $t_9$ |

FIG. 4

METHOD AND APPARATUS FOR TRACE DATA COLLECTION

BACKGROUND

A common practice in software data-path implementations is to utilize tracing. Tracing involves the use of logging to record information about a program's execution. Trace data generated during a program's execution can be used for bug analysis, performance analysis and provide crucial hints for data recovery. As trace data is produced from a data-path flow, it is desirable for the CPU cost of generating the trace data to be minimized. Furthermore, as trace data is produced from a data-path flow, it is desirable for the trace data to be compact, so that a very high rate of traces generation will be supported. At present, the need exists for new techniques for generating trace data that are reliable are efficient with respect to the computing resources they require.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for collecting trace data items generated by a plurality of trace points, the method comprising: allocating a ring buffer in a first memory, the ring buffer including a plurality of trace buffers; when any of the trace points is executed, storing a trace data item generated by the trace point in one of the plurality of trace buffers that is identified by a given value of a ring pointer; retrieving the trace data item from the trace buffer based on at least one of: (i) a first timestamp that is generated when the trace data item is stored in the trace buffer, and (ii) a second timestamp indicating a time when the ring pointer was assigned the given value; and storing the retrieved trace data item in a second memory device.

According to aspects of the disclosure, an apparatus is provided for collecting trace data items generated by a plurality of trace points, the apparatus comprising: a first memory device; a second memory device; and at least one processor operatively coupled to the first memory device and the second memory device, the at least one processor being configured to: allocate a ring buffer on the first memory device, the ring buffer including a plurality of trace buffers; when any of the trace points is executed, store a trace data item generated by the trace point in one of the plurality of trace buffers that is identified by a given value of a ring pointer; retrieve the trace data item from the trace buffer based on at least one of: (i) a first timestamp that is generated when the trace data item is stored in the trace buffer, and (ii) a second timestamp indicating a time when the ring pointer was assigned the given value; and store the retrieved trace data item on the second memory device.

According to aspects of the disclosure, a non-transitory computer-readable medium storing one or more processor-executable instructions, which when executed by at least one processor cause the at least one processor to perform method for collecting trace data items generated by a plurality of trace points, the method comprising: allocating a ring buffer in a first memory, the ring buffer including a plurality of trace buffers; when any of the trace points is executed, storing a trace data item generated by the trace point in one of the plurality of trace buffers that is identified by a given value of a ring pointer; retrieving the trace data item from the trace buffer based on at least one of: (i) a first timestamp that is generated when the trace data item is stored in the trace buffer, and (ii) a second timestamp indicating a time when the ring pointer was assigned the given value; and storing the retrieved trace data item in a second memory device.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 4 is a diagram of an example of a ring pointer database, according to aspects of the disclosure;

DETAILED DESCRIPTION

Figure 1:
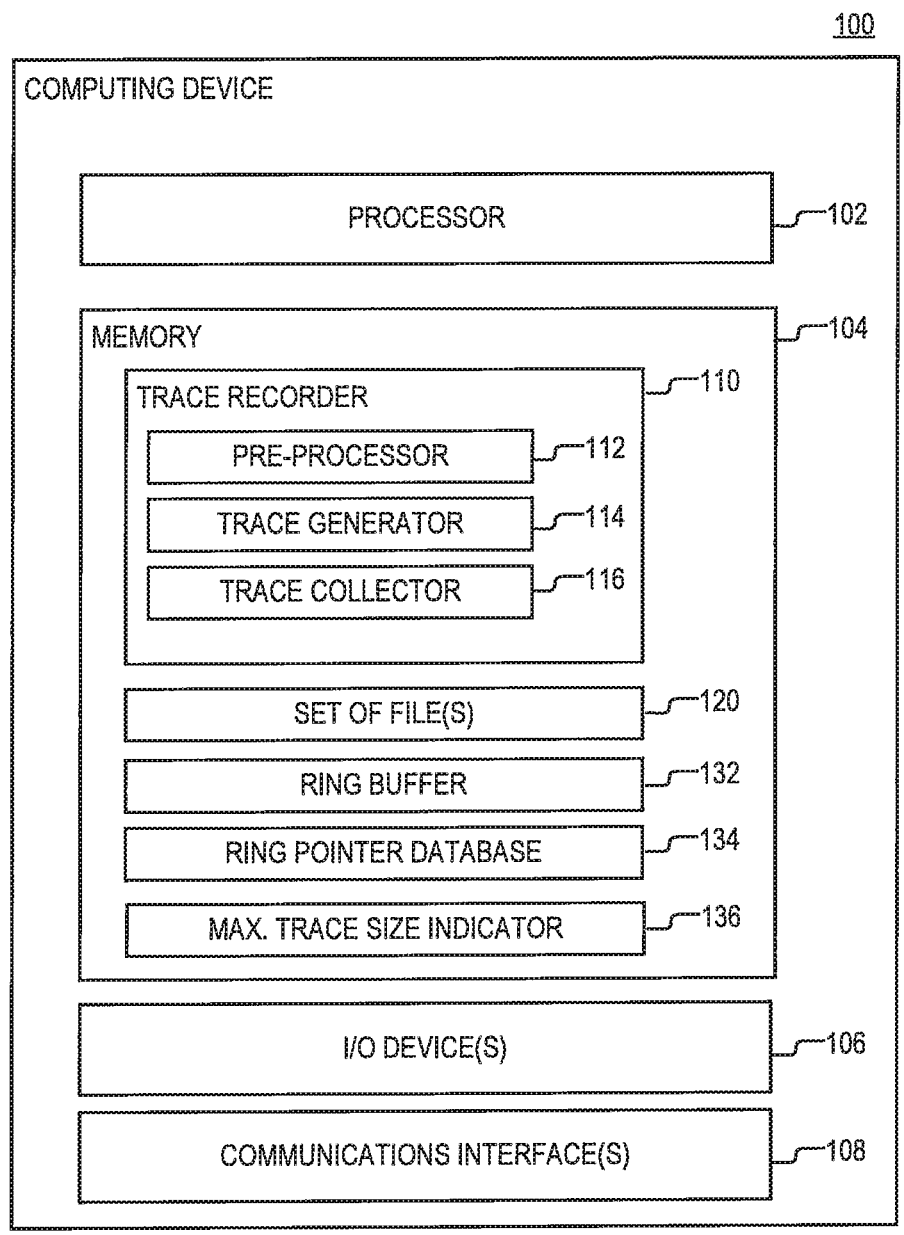
FIG. 1 is a diagram of an example of a computing device, according to aspects of the disclosure.

FIG. 1 is a diagram of an example of a computing device 100 that is configured to implement one or more techniques for trace collection, according to aspects of the disclosure. As illustrated, the computing device 100 may include one or more processors 102, a memory 104, I/O device(s) 106, and a communications interface 108 that are operatively coupled to one another. The processor 102 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 104 may include any suitable type of volatile and/or non-volatile memory. In some implementations, the memory 104 may include one or more of a random-access memory (RAM), a dynamic random memory (DRAM), a flash memory, a hard drive (HD), a solid-state drive (SSD), a network accessible storage (NAS), and or any other suitable type of memory device. The I/O device(s) 106 may include any suitable type of input and/or output device, such as one or more mice, one or more keyboards, one or more microphones, or one more display monitors, for example. The communication(s) interfaces may include any suitable type of communications interface, such as one or more Ethernet adapters, one or more Wi-Fi adapters (e.g., 802.11 adapters), and one or more Long-Term Evolution (LTE) adapters, for example.

Although FIG. 1 depicts the computing device 100 as an integrated system, it will be understood that in some implementations, the computing device 100 may be a distributed system. In such instances, the computing device 100 may include a plurality of nodes that are connected to one another via a communications fabric (e.g., an InfiniBand network, a Local Area Network, etc.). Each node may include a respective processor, a respective memory, respective I/O device(s), and respective communication(s) terminal. In this regard, it will be understood that the techniques for trace collection that are described in this disclosure are not limited to any particular computing platform.

In some implementations, the computing device 100 may be configured to execute a trace recorder 110, as shown. In the present example, the trace recorder 110 includes one or more processor-executable instructions which when executed by at least one processor cause the processor to collect and record trace data generated by trace points in any of the files 120. As used throughout the disclosure, the term "trace point" may refer to one or more processor-executable instructions that are inserted or otherwise associated with a file, which when executed by at least one processor, cause the at least one processor to generate set of trace data that identifies at least a portion of a state or context of a process (or thread) that is instantiated using the file. The set of trace data that is generated by a trace point may be referred to as a "trace data item."

Figure 2:
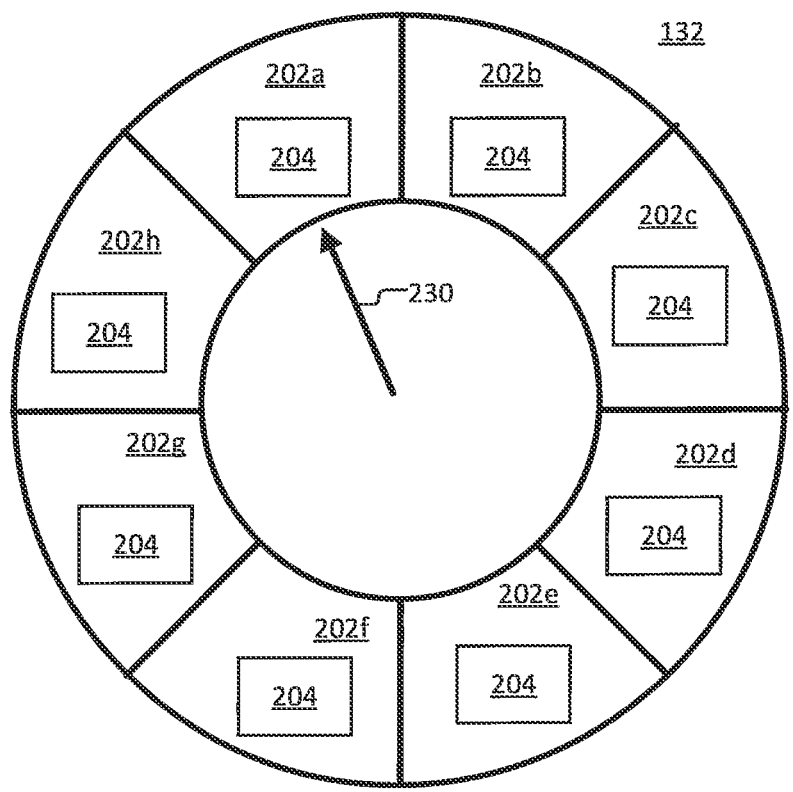
FIG. 2 is a diagram of an example of a ring buffer, according to aspects of the disclosure.
Figure 3:
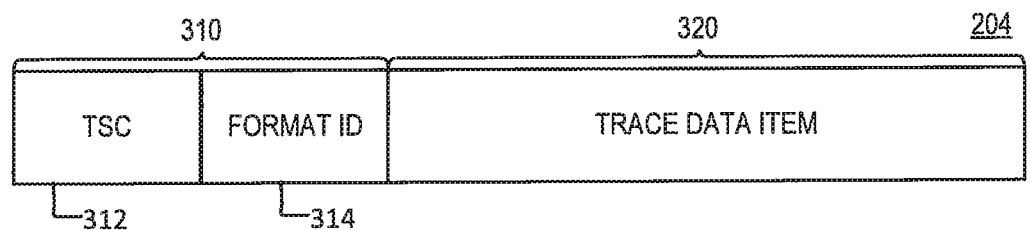
FIG. 3 is a diagram of an example of a trace packet, according to aspects of the disclosure.

The set of files 120 may include one or more files that are stored in the memory 104 of the computing device 100. Any of the files 120 may include any suitable type of file that includes processor-executable instructions and has one or more trace points inserted therein or otherwise associated therewith. In some implementations, any of the files 120 may include an executable file, a library file, and/or any other suitable type of file. In some implementations, any of the files 120 may include compiled code, interpreted code, binary code, intermediate code, and/or any other suitable type of processor-executable code. In some implementations, the trace data items generated by different trace points in the files 120 may have different formats. For example, the trace data item generated by one trace point may be encoded in ASCII, whereas the trace data item generated by another trace point may be encoded in a binary format. The ring buffer 132 may provide temporary storage for data that is generated by the trace points in the files 120. In some implementations, the ring buffer 132 may be stored in a volatile memory of the computing device 100 (e.g., RAM). As illustrated in FIG. 2, the ring buffer 132 may include a plurality of trace buffers 202 that are associated with a ring pointer 230. Each of the trace buffers 202 in the ring buffer 132 may be used to store a different trace packet 204. In some implementations, the term "trace packet" may refer to any suitable type of data structure that encapsulates a trace data item that is generated by a given trace. As illustrated in FIG. 3, each trace packet 204 may include a header 310 and a trace data item 320. The header 310 may include a timestamp 312 and a format ID 314. The timestamp 312 may include a number, a string, and/or an alphanumerical string that identifies the time when trace packet 204 is completed. The format ID 314 may include a number, a string, and/or an alphanumerical string that identifies the format of the trace data item 320. In some implementations, the header 310 may be 8 bytes wide, as most current computing systems have native word size that is 64 bits wide. In some implementations, aligning the size of the header 310 with the native word size of the computing device 100 could facilitate the implementation of atomic read/write memory operations for the header 310. Although in the example of FIG. 1, only one ring buffer 132 is shown, it will be understood that in some implementations, when the processor 102 includes multiple cores, a different ring buffer 132 may be allocated for each core of the processor 102.

The ring pointer 230 may include any suitable number, string, or alphanumerical string that references one of the trace buffers 202. In some implementations, the ring pointer 230 may be used exclusively to store trace packets in the ring buffer 132 (e.g., by the trace generator 114), while another ring pointer is used to retrieve the stored packets from the ring buffer 132 (e.g., by the trace collector 116). In some implementations, the ring pointer 230 may indicate the address of the ring buffer in which the trace recorder 110 has most recently began storing data in. Additionally or alternatively, in some implementations, the ring pointer 230 may indicate the address of the ring buffer in which the trace recorder 110 will begin storing data in when a next trace point is executed. As is discussed further below, in multi-tasking systems, situations may arise in which multiple trace buffers 202 are being written concurrently. In such situations, the current value of the ring pointer 230, at any time instant, may indicate the address of the trace buffer 202 in which the trace recorder 110 has most recently begun to store data in.

The ring pointer database 134 may include a plurality of records that identify the values which have been previously assigned to the ring pointer 230 along with a respective time when each of the values was assigned to the ring pointer 230. As illustrated, the record 410*a* may indicate that at time $t_1$ the ring pointer 230 referenced trace buffer 202*a*; the record 410*b* may indicate that at time $t_2$ the ring pointer 230 referenced trace buffer 202*b*; the record 410*c* may indicate that at time $t_3$ the ring pointer 230 referenced trace buffer 202*c*; the record 410*d* may indicate that at time $t_4$ the ring pointer 230 referenced trace buffer 202*d*; the record 410*e* may indicate that at time $t_5$ the ring pointer 230 referenced trace buffer 202*e*; the record 410*f* may indicate that at time $t_6$ the ring pointer 230 referenced trace buffer 202*f*; the record 410*g* may indicate that at time $t_1$ the ring pointer 230 referenced trace buffer 202*g*; the record 410*h* may indicate that at time $t_8$ the ring pointer 230 referenced trace buffer 202*h*; the record 410*i* may indicate that at time $t_9$ the ring pointer 230 referenced trace buffer 202*a*. Because the ring buffer 132 is implemented as a ring buffer, the value of the ring pointer 230 may revert to its initial state (e.g., a state in which it references the trace buffer 202*a*) every N increments, wherein N is the number of trace buffers in the ring buffer 132. As is further discussed below with respect to FIG. 9, the ring pointer database 134 may be used to ensure that a trace buffer was not overwritten while data was being collected from the trace buffer.

The maximal trace size indicator 136 may identify the size of the largest trace data item that can be generated by any of the trace points in the files 120 (hereinafter "maximal trace size"). The maximal trace size indicator 136 may be any suitable type of number, string, and/or alphanumerical string that is stored in the memory 104 and which identifies the maximal trace size. In some implementations, the maximal trace size indicator 136 may be used as a basis for allocating the trace buffers 202 in the ring buffer 132. When the maximal trace size indicator 136 is used as a basis for allocating the trace buffers 202, each of the trace buffers 202 may be allocated to a size that is large enough to accommodate the largest trace data item that can be generated by any of the trace points in the files 120, as well as any header information and other metadata that might be associated with the largest trace data item. In this regard, using the indicator 136 as a basis for allocating the trace buffers 202 may help facilitate efficient usage of memory space.

In some implementations, the trace recorder 110 may include a pre-processor 112, a trace generator 114, and a trace collector 116. In some implementations, the trace recorder 110 may be implemented, at least in part, as a kernel module. Additionally or alternatively, in some implementations, the trace recorder 110 may be implemented as a user space program. Additionally or alternatively, in some implementations, the pre-processor 112 may be implemented in software (e.g., one or -more processor executable instructions executed by the processor 102), hardware, and/or a combination of software and hardware. Additionally or alternatively, in some implementations, the trace generator 114 may be implemented in software (e.g., one or -more processor executable instructions executed by the processor 102), hardware, and/or a combination of software and hardware. Additionally or alternatively, in some implementations, the trace collector 116 may be implemented in software (e.g., one or -more processor executable instructions executed by the processor 102), hardware, and/or a combination of software and hardware. The manner in which the pre-processor 112, the trace generator 114, and the trace collector 116 interact is further discussed with respect to FIG. 5.

Figure 5:
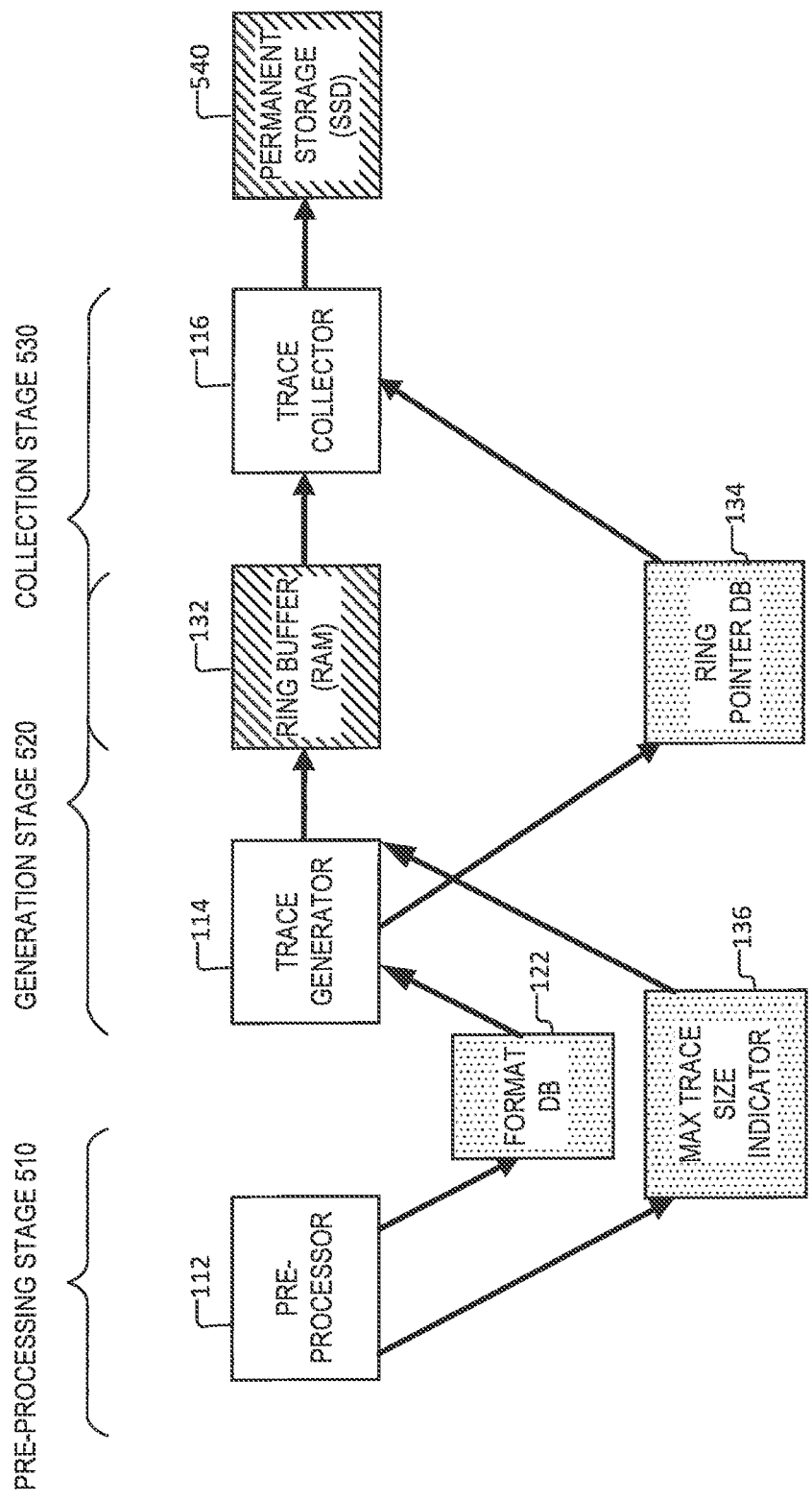
FIG. 5 is a diagram illustrating the operation of a trace recorder, according to aspects of the disclosure.

FIG. 5 is a diagram illustrating an example of the operation of the trace recorder 110. As illustrated, the operation of the trace recorder 110 includes a pre-processing stage 510, a generation stage 520, and a collection stage 530. In some implementations, the pre-processing stage 510 may be performed before the generation stage 520 and the collection stage 530. In some implementations, the generation stage 520 and the collection stage 530 may be performed concurrently with one another. Furthermore, in some implementations, the pre-processing stage 510 may be performed before runtime of the files 120, and the generation stage 520 and the collection stage 530 may be performed during runtime of the files 120.

The pre-processing stage 510 may be performed by the pre-processor 112. In some implementations, during the pre-processing stage, the pre-processor 112 may scan the files 120 and perform at least one of: (i) identifying the size of each trace data item that is produced by trace points in the files 120, (ii) identifying the format of each trace data item that is produced by the trace points in the files 120, and (iii) determining the value of the maximal trace size indicator 136. In some implementations, the pre-processing stage 510 may assign a format ID to each trace point. The format ID may include any suitable type of number, string, and/or alphanumerical string that identifies the format of the trace data item that is generated by the trace point. In some implementations, assigning the format ID to a given trace point may include compiling-in the format ID into the given trace point. When the format ID is compiled into the given trace point, one or more processor-executable instructions may be included into a file that contains the given trace point, which when executed by a processor cause the format ID to be included in the trace point data item (or other data) that is generated when the given trace point is executed. In some implementations, the pre-processing stage 510 may be performed in accordance with a process 700, which is discussed further below with respect to FIG. 7.

The generation stage 520 may be performed by the trace generator 114. During the generation stage, the trace generator 114 may obtain trace data items generated by trace points in the files 120 and store the trace data items in the ring buffer 132. In some implementations, during the generation stage 520 the trace generator may at least one of: (i) allocate the ring buffer 132 based on the maximal trace size indicator, (ii) increment the ring pointer 230 of the ring buffer 132, ((iii) obtain at least one trace data item that is generated by one of the trace points in the files 120, (iv) generate a trace packet including the obtained trace data item and a format ID identifying the trace data item, and (v) store the trace packet in the ring buffer 132. In some implementations, the generation stage 520 may be performed in accordance with a process 800, which is discussed further below with respect to FIG. 8.

The collection stage 530 may be performed by the trace collector 116. In some implementations, during the collection stage 530, the trace collector 116 may retrieve trace packets that are stored in the ring buffer 132 and store the trace packets in a permanent storage 540. The permanent storage 540 may include any suitable type of memory device or portion thereof. For example, in some implementations, the permanent storage may include a portion of the memory 104. Additionally or alternatively, in some implementations, the permanent storage 540 may include a non-volatile memory device that is part of the memory 104 (e.g., a hard drive or an SSD). As can be readily appreciated, the present disclosure is not limited to any specific implementation of the permanent storage 540. Furthermore, in some implementations, the trace collector 116 may monitor the value of the ring pointer 230 to detect when the ring pointer 230 is incremented. Afterwards, the trace collector 116 may store a record in the ring pointer database 134 that includes the new value of the ring pointer 230 and a timestamp identifying the time (e.g., exact time or approximate time) when the ring pointer 230 was assigned the new value.

As noted above, the generation stage 520 and the collection stage 530 may be performed concurrently, which necessitates the operation of the trace collector 116 to be synchronized with the operation of the trace generator 114. If the trace generator 114 and the trace collector 116 are not synchronized correctly, the trace collector 116 may: (i) collect incomplete trace packets from the ring buffer 132 (i.e., collect packets which the trace generator 114 has not yet finished recording), (ii) fail to collect some of the trace packets in the ring buffer 132 before those packets are overwritten by the trace generator 114, and (iii) collect trace packets from the ring buffer which are partially overwritten and thus corrupted. The latter error may occur when the trace collector 116 begins retrieving a trace packet from a trace buffer 202 before the trace generator 114 has begun overwriting the trace buffer, and finishes retrieving the trace packet from the trace buffer 202 after the trace generator 114 has begun overwriting the trace buffer.

As is well known in the art, the above errors can be avoided through the use of locks and/or validity bits. However, the use of locks and/or validity bits requires additional memory space and additional CPU cycles to be consumed by the trace recorder. Furthermore, the use of validity bits and/or locks may create cache-line contention issues and introduce bugs in the trace generator 114 to the trace collector 116, and vice versa. For example, when a lock is placed on a given trace buffer while the trace collector 116 collects a packet from it, if the trace collector 116 freezes and does not release a lock that is placed on a given trace buffer 202, the trace generator 114 and the trace collector 116 would be stuck in a deadlock. Moreover, using such lock may require extra CPU cycles to be used as it introduces contention on the lock and its cache line.

According to aspects of the disclosure, the architecture of the trace recorder 110 may ensure correct synchronization between the trace generator 114 and the trace collector 116 while avoiding some of the disadvantages that are inherent in the use of lock mechanisms and validity bits. For example, the use of the ring buffer 132 as temporary storage for generated trace packets may help avoid cache-line contention, and thus slow cache-misses. As discussed above, the ring pointer 230 identifies the next free buffer. In some implementations, before each trace packet generation, the trace recorder 110 may atomically increment the value of the ring pointer 230 and uses the previous value (modulo ring size) to address the ring buffer 132, predictably ensuring that a predetermined set of memory locations will always be used as temporary storage for trace packets that are being generated, and thus reducing the likelihood of cache misses.

In some implementations, the trace collector 116 may use the respective timestamp 312 that is part of each trace packet 204 to determine whether that trace packet 204 is completed and ready to be collected from the ring buffer 132. For example, for any trace packet 204, the trace collector 116 may identify a current time and the time indicated by the timestamp 312 of the trace packet 204. The trace collector 116 may then detect whether a first waiting period has passed (e.g., 10 ms) since the timestamp 312 was recorded. If the first waiting period has passed, the trace collector 116 may retrieve the trace packet 204 from the ring buffer 132 and store it in permanent storage. If the first waiting period has not passed, the trace collector 116 may wait until the first waiting period passes to collect the trace packet 204.

Additionally or alternatively, in some implementations, the trace collector 116 may monitor the value of the ring pointer 230 to detect when the ring pointer 230 is incremented. When the ring pointer 230 is incremented, the trace collector 116 may store a record in the ring pointer database 134 that includes the new value of the ring pointer 230 and a timestamp identifying the time when the ring pointer 230 was assigned the new value. The trace collector 116 may use the ring pointer database 134 to determine whether a given trace packet 204 is completed and ready to be collected from the ring buffer 132. As noted above, the given trace packet 204 may be stored in a particular trace buffer 202 of the ring buffer 132. Before the given trace packet 204 is stored in the particular trace buffer 202, the ring pointer 230 may be incremented to a value that indicates the address of the particular trace buffer 202. When the trace collector 116 is ready to retrieve the given trace packet 204 from the ring buffer 132, the trace collector 116 may search the ring pointer database 134 to determine the most recent time when the ring pointer 230 was set to indicate the address of the particular trace buffer 202 where the given trace packet 204 is stored. The trace collector 116 may then detect the current time and determine whether a second waiting period has passed since the ring pointer 230 was set to indicate the address of the particular trace buffer 202 where the given trace packet 204 is stored. If the second waiting period has passed, the trace collector 116 may retrieve the given trace packet 204 from the particular trace buffer 202 and stored in permanent storage. If the second waiting period has not passed, the trace collector 116 may wait until the second waiting period passes to collect the given trace packet 204.

In some aspects, waiting for the first waiting period and/or the second waiting period may help guard against a subtler type of error that could occur when the timestamp 312 in a trace packet 204 does not correctly indicate the time when the trace packet 204 is completed. Ideally, the trace generator 114 may be configured to stream the entire trace data item 320 into the trace packet 204 before writing the timestamp 312 into the trace packet 204. However, due to parallelism and/or out-of-order execution that takes place at the processor level, the timestamp 312 may be at times written to the trace packet 204 before trace generator 114 has finished streaming the trace data item 320 into that trace packet 204. In such instances, the timestamp 312 may misleadingly indicate that the trace packet 204 is completed when it is not. In this regard, waiting by the trace collector 116 for the first waiting period (or second waiting period) before collecting the trace packet 204 may give the trace collector 116 enough time to complete the trace packet 204 before it is collected.

Additionally or alternatively, in some implementations, the trace collector 116 may monitor the value of the ring buffer 132 while a given trace packet 204 is being retrieved from a particular trace buffer 202 in order to confirm that trace buffer 202 has not been (partially) overwritten while the retrieval was taking place. More particularly, at the start of the retrieval, the trace collector 116 may determine the current value of the ring counter (hereinafter "first value of the ring counter"). At the end of the retrieval, the trace collector may again determine the current value of the ring counter (hereinafter "second value of the ring counter"). Based on the first and second values of the ring counter, the trace collector 116 may determine a range of values that were assigned to the ring pointer 230 while the retrieval of the given trace packet 204 was taking place. If any of the values in the range identifies the particular trace buffer 202 from which the given trace packet 204 is retrieved, the trace collector 116 may determine that the particular trace buffer 202 was at least partially overwritten by the trace generator 114 while the retrieval was taking place and discard any information that was retrieved from the particular trace buffer.

According to aspects of the disclosure, by utilizing the pre-processor 112, the trace recorder 110 may ensure that the ring buffer is allocated to a suitable size. The pre-processor 112 may be executed before runtime of the files 120. When executed, the preprocessor may scan the files 120 to identify each trace point (or at least some of the trace points) in the files 120. For each trace point, the pre-processor 112 may identify the size of the trace data item generated by the trace point. The pre-processor 112 may then identify the maximum size of the largest trace data item that can be generated by the trace point and store an indication of the size in the memory 104 as the maximal trace size indicator 136. Afterwards, when the trace buffers 202 in the ring buffer 132 are allocated, the size of each trace buffer 202 may be set to equal the sum of the size of the largest trace data item that can be generated plus and the size of the header 310. By doing so, the trace recorder 110 may ensure that: (i) the trace buffers 202 are large enough to accommodate any of the trace data items generated by trace points in the files 120, and (ii) no unused memory space is allocated to the ring buffer 132.

Furthermore, in some implementations, the pre-processor 112 may further help increase the speed at which trace data is recorded by the trace recorder 110. When the pre-processor 112 is executed, the pre-processor 112 may identify the format of the respective trace data item that is produced by each (or at least some) of the traces in the files 120. As discussed above with respect to FIG. 3, the format ID of a trace data item that is generated by a trace point may be inserted in a trace packet 204 that encapsulates the trace data item. Including the format ID in the trace packet 204 can help convert trace data in the packet (if necessary) at a later time, and it does away with the need to perform data conversions of the trace data item at run time, which in turn results in an increase of the speed at which data can be stored and collected from the ring buffer 132.

Figure 6:
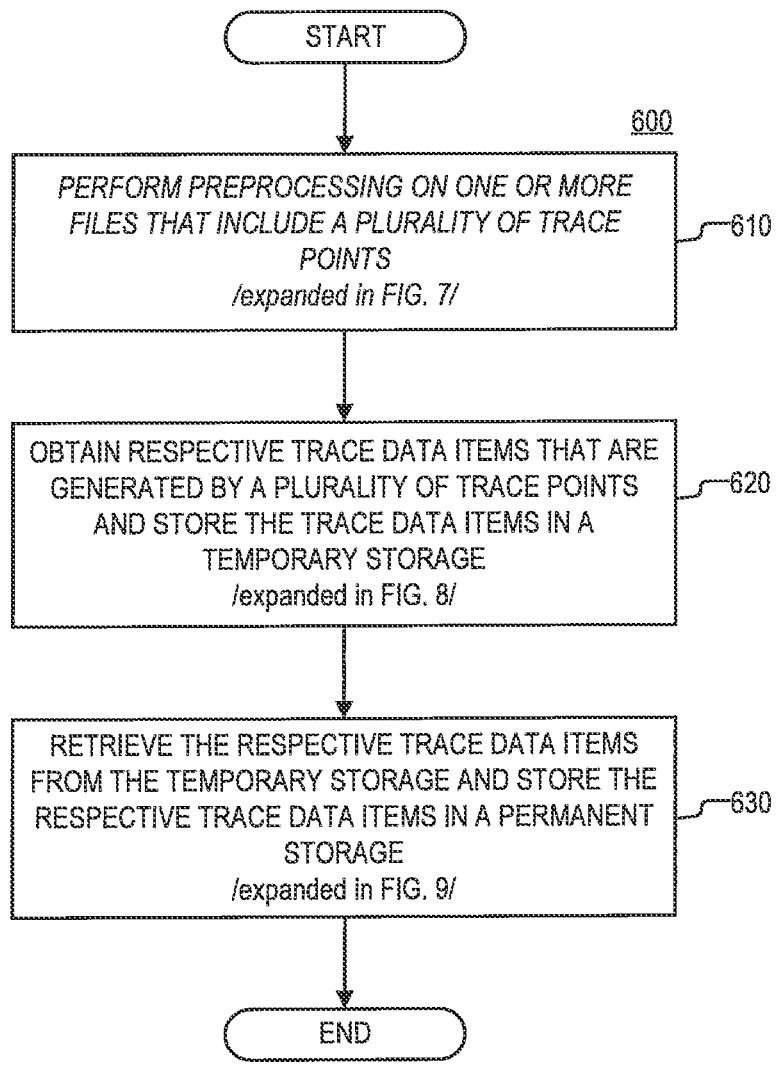
FIG. 6 is a flowchart of an example of a process, according to aspects of the disclosure.

FIG. 6 is a flowchart of an example of a process 600 for collecting trace data for one or more files in a computing system. At step 610, a preprocessing is performed on one or more files that include a plurality of trace points. In some implementations, the preprocessing may be performed before the one or more files are executed. Step 610 is discussed further below with respect to FIG. 7. At step 620, respective trace data items generated by the plurality of trace points are obtained and stored in temporary storage. Step 620 is discussed further below with respect to FIG. 8. At step 630, the trace data items are retrieved from the temporary storage and stored in permanent storage. Step 630 is discussed further below with respect to FIG. 9. In some implementations, steps 620 and 630 may be executed during runtime of the files for which trace data is collected. Additionally or alternatively, in some implementations, steps 620 and 630 may be executed after step 610. Additionally or alternatively, in some implementations, steps 620 and 630 may be executed concurrently with one another.

Figure 7:
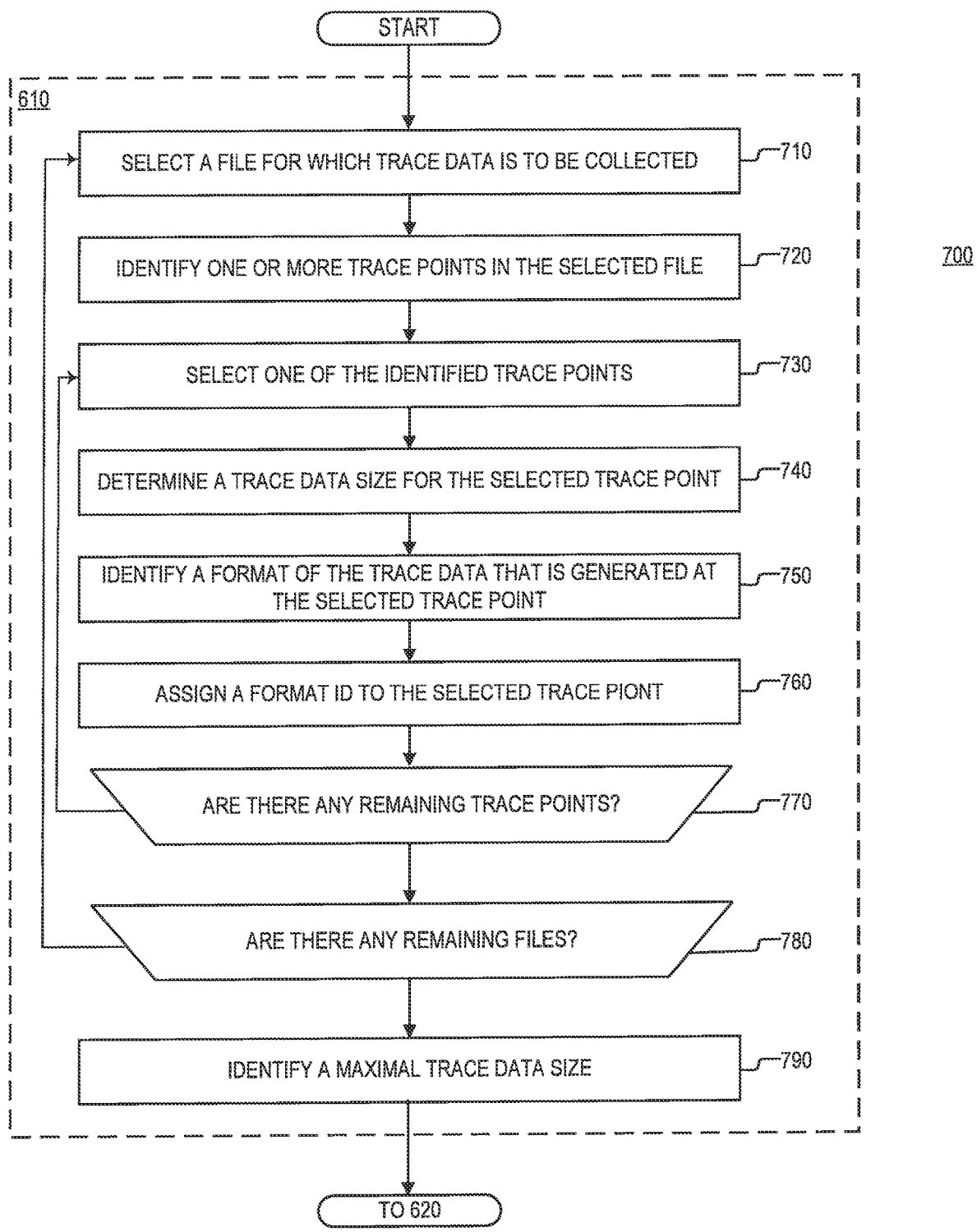
FIG. 7 is a flowchart of an example of a sub-process associated with the process of FIG. 6, according to aspects of the disclosure.

FIG. 7 is a flowchart of an example of a process 700 for preprocessing one or more files that contain trace points, as specified by step 610 of the process 600. At step 710, a file for which trace data is to be collected is selected for preprocessing. At step 720, one or more trace points in the file are identified. At step 730, one of the identified trace points is selected. At step 740, the size of the trace data item that will be generated by the selected trace point, when the selected trace point is executed, is determined. At step 750, the format of the trace data item that will be generated by the selected trace point, when the selected trace point is executed, is determined. At step 760, a format ID is assigned to the selected trace point. The format ID may include any suitable type of number, string, and/or alphanumerical string that identifies the format of the trace data that is determined at step 750. In some implementations, assigning the format ID to the selected trace point may include compiling-in the format ID into the file that includes the selected trace point. When the format ID is compiled into the file, one or more processor-executable instructions may be included into the file, which when executed by a processor cause the format ID to be included in the trace point data item (or other data) that is generated when the selected trace point is executed. At step 770, a determination is made whether if there are any trace points in the selected file that remain to be processed. If there are any trace points in the selected file that remain to be processed, the process 700 returns to step 730. Otherwise, the process proceeds to step 780. At step 780, a determination is made whether there are any other files that remain to be processed. If there are other files that remain to be processed, the process 700 returns to step 710 and steps 720-770 are repeated again for one of the files that remain to be processed. If there are no other files that remain to be processed, the process proceeds to step 790. At step 790, a maximal trace size is determined for the trace points processed during all iterations of steps 730-770. In some implementations, the maximal trace size may be the size of the largest trace data item that can be generated by any of the trace points processed during all iterations of steps 730-770.

Figure 8:
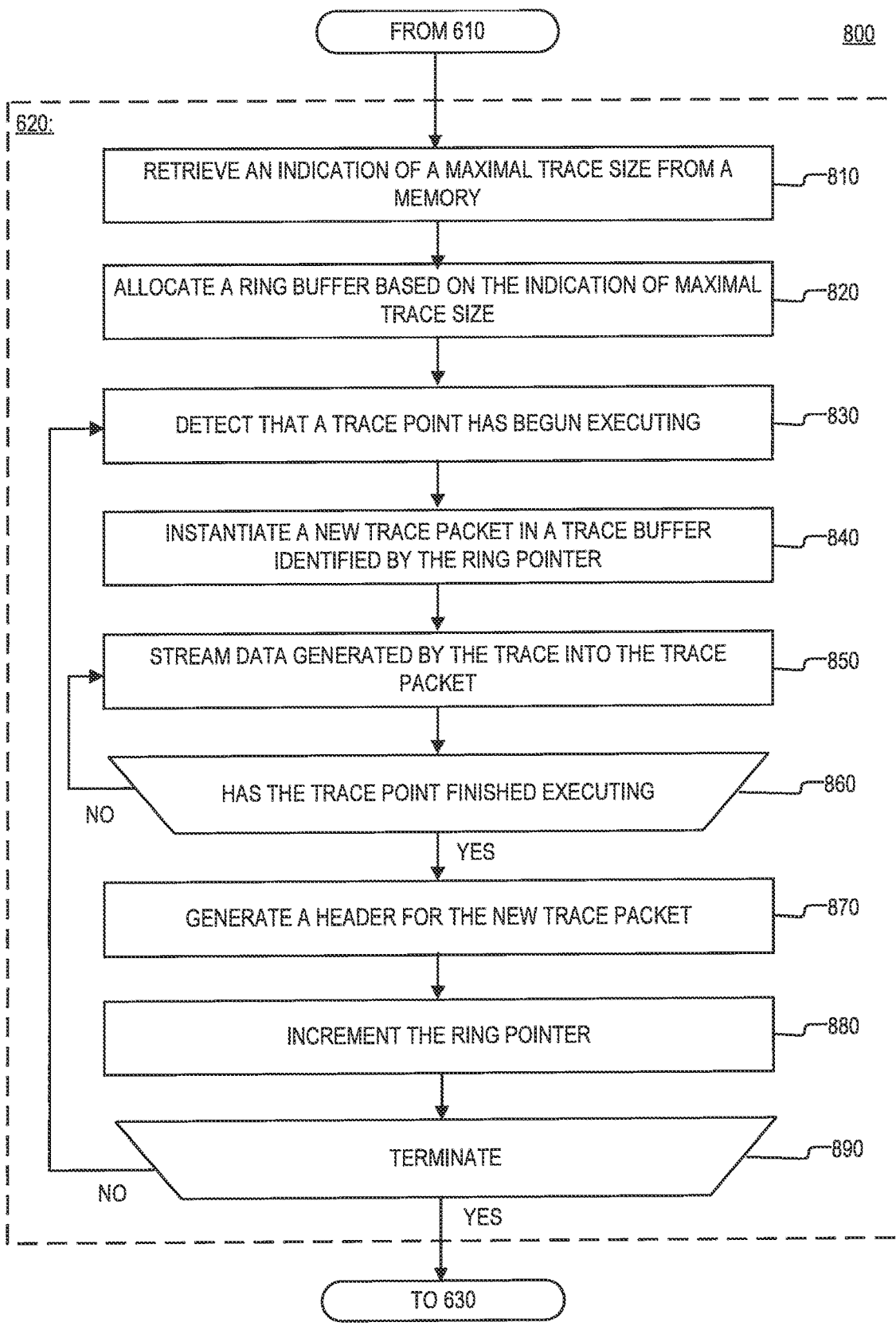
FIG. 8 is a flowchart of an example of a sub-process associated with the process of FIG. 6, according to aspects of the disclosure.

FIG. 8 is a flowchart of an example of a process 800 for collecting point data items that are generated by a plurality of trace points and storing the trace data items in temporary storage, as specified by step 620 of the process 600. At step 810, an indication of a maximal trace size is retrieved from a memory. At step 820, a ring buffer is allocated based on the indication of maximal trace size. In some implementations, allocating the ring buffer may include allocating each of a plurality of trace buffers and a ring pointer that is configured to reference one of the trace buffers every time the ring pointer is incremented. In some implementations, the ring buffer may be allocated in RAM. At step 830, it is detected that one of the plurality of trace points has begun executing. At step 840, a new trace packet is instantiated and stored in a trace buffer that is indicated by a current value of the ring pointer. At step 850, a trace data item generated by the trace point begins to be streamed into the new trace packet. At step 860, a determination is made whether the entire trace data item has already been streamed into the new trace packet. If a portion of the trace data item still remains to be streamed into the new trace packet, the process 800 returns to step 850. If the entire trace data item has been streamed into the new trace packet, the process proceeds to step 870. At step 870, a header is generated for the new trace packet that includes a time stamp and format ID. The timestamp may identify a current time when step 870 is performed. The format ID may identify a format of the trace data item that is stored in the new trace packet. In some implementations, the format ID may be extracted from the trace data item for inclusion into the header of the new trace packet. At step 880, the ring pointer is incremented. At step 890, a determination is made whether there are any remaining trace points in the plurality that remain to be processed. If there are other trace points that remain to be processed, the process 800 returns to step 820 and steps 820-880 are repeated for another trace point. If there are no other trace points that remain to be processed, the process ends.

Figure 9:
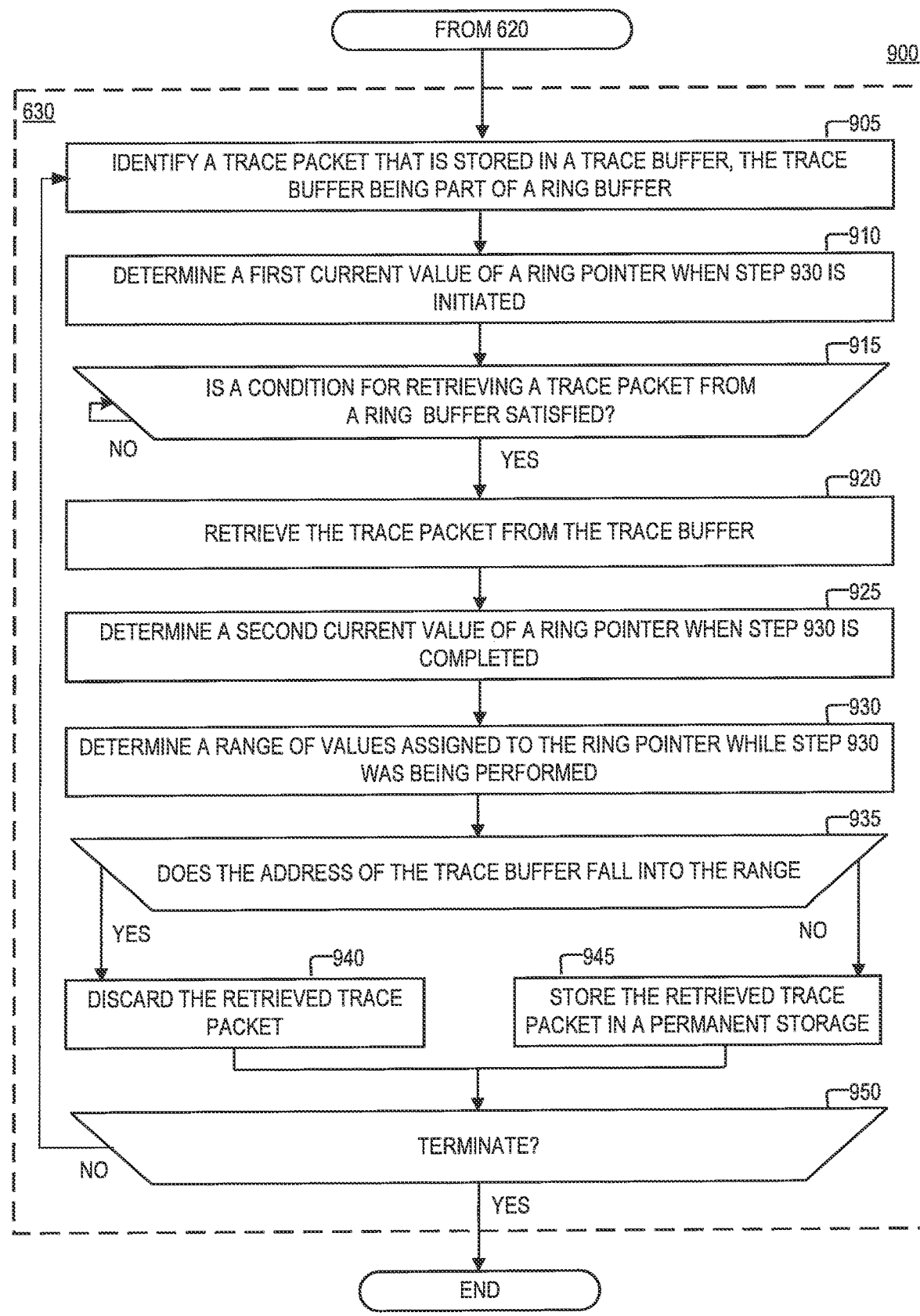
FIG. 9 is a flowchart of an example of a sub-process associated with the process of FIG. 6, according to aspects of the disclosure.

FIG. 9 is a flowchart of an example of a process 900 for retrieving trace data items from temporary storage and storing the trace data items in permanent storage, as specified by step 630 of the process 600. At step 905, a trace packet is identified that is stored in a trace buffer having a particular address. As noted above, the trace buffer may be part of a ring buffer that is associated with a ring pointer. At step 910, a current value of the ring pointer (hereinafter "first value of the ring pointer) is determined. At step 915, a determination is made whether a condition for retrieving the trace packet from the trace buffer is satisfied. If the condition is satisfied, the process 900 proceeds to step 920. Otherwise, the process 900 remains at step 915. At step 920 the trace packet is retrieved from the trace buffer and stored in permanent storage. At step 925, the current value of the ring pointer (hereinafter "second value of the ring pointer") is again determined. At step 930, a range of values assigned to the ring pointer while step 920 was being performed is determined based on the first value of the ring pointer and the second value of the ring pointer. As can be readily appreciated, the range may span the first value of the ring pointer and the second value of the ring pointer. At step 935, a determination is made if while the trace packet was being retrieved from the trace buffer, the pointer had been assigned a value that identifies the particular address of the trace buffer. If the ring pointer has been assigned a value identifying the particular address of the trace buffer, it is possible that the trace buffer had begun to be overwritten with new data before the retrieval of the trace packet was completed. In such circumstances, the process proceeds to step 940 where any data collected from the trace buffer is discarded. If the ring pointer was not assigned a value that identifies the address of the trace buffer from which the trace buffer is retrieved, it is likely that the contents of the trace buffer had not been modified while the retrieval of the trace packet from the trace buffer was ongoing. In such circumstances, the process proceeds to step 945 where the retrieved trace packet is stored in permanent storage. At step 950, a determination is made if there are any remaining trace packets that remain to be retrieved from the ring buffer. If there are packets that remain to be retrieved from the ring buffer, the process 900 returns to step 905, and steps 905-945 are repeated for another trace packet. If there are no trace packets that remain to be retrieved from the trace buffer, the process ends.

Figure 10:
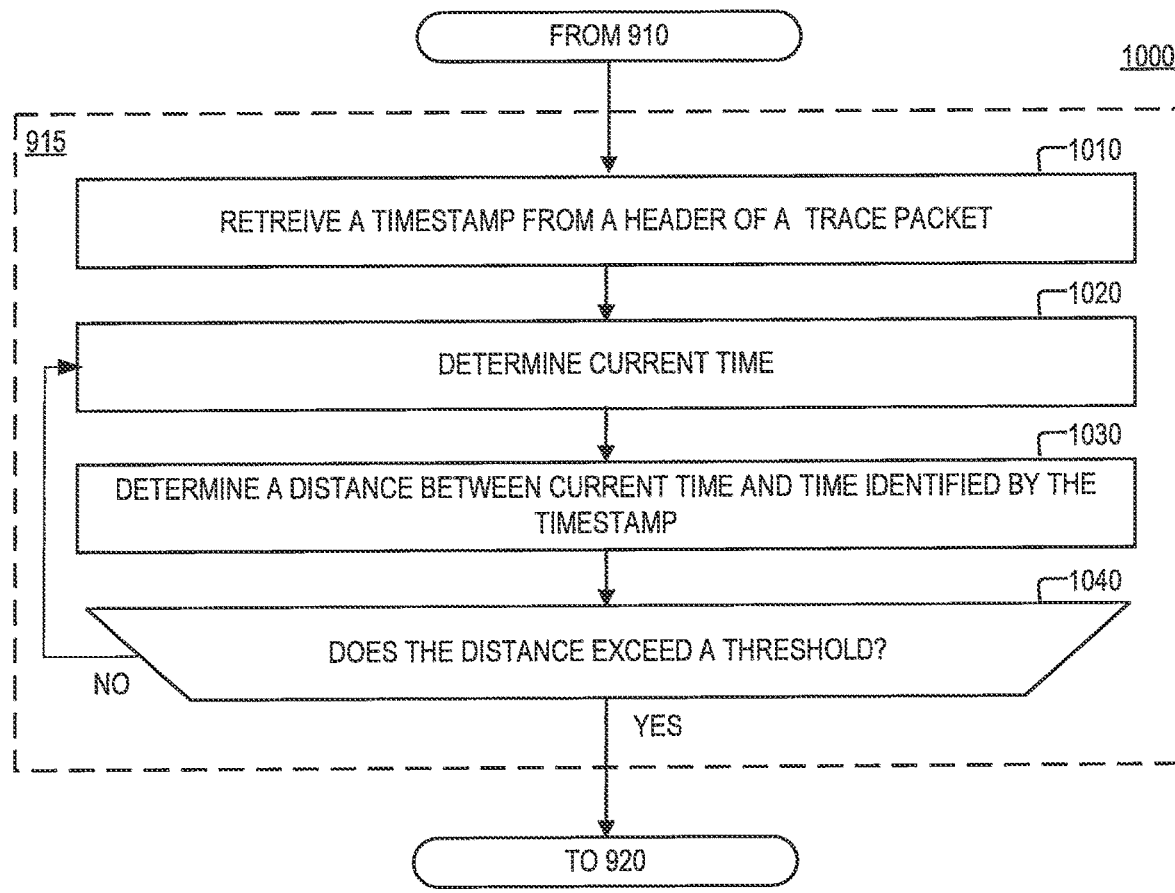
FIG. 10 is a flowchart of an example of a sub-process associated with the process of FIG. 9, according to aspects of the disclosure.

FIG. 10 is a flowchart of an example of a process 1000 for determining whether a condition for retrieving a trace packet from a trace buffer is satisfied, as specified by step 915 of the process 900. In the example of FIG. 10, the predetermined condition is satisfied when a first waiting period has passed following a time that is identified by a timestamp that is stored in the trace packet. At step 1010, a timestamp is retrieved from the header of the trace packet. At step 1020, a current time is determined. At step 1030, a distance is determined between the current time and the time indicated by the time stamp. At step 1040, a determination is made whether the distance is greater than a threshold. If the time difference is greater than the threshold, the process 1000 proceeds to step 920 of the process 900. If the time difference is not greater than the threshold, the process 1000 returns to step 1020.

Figure 11:
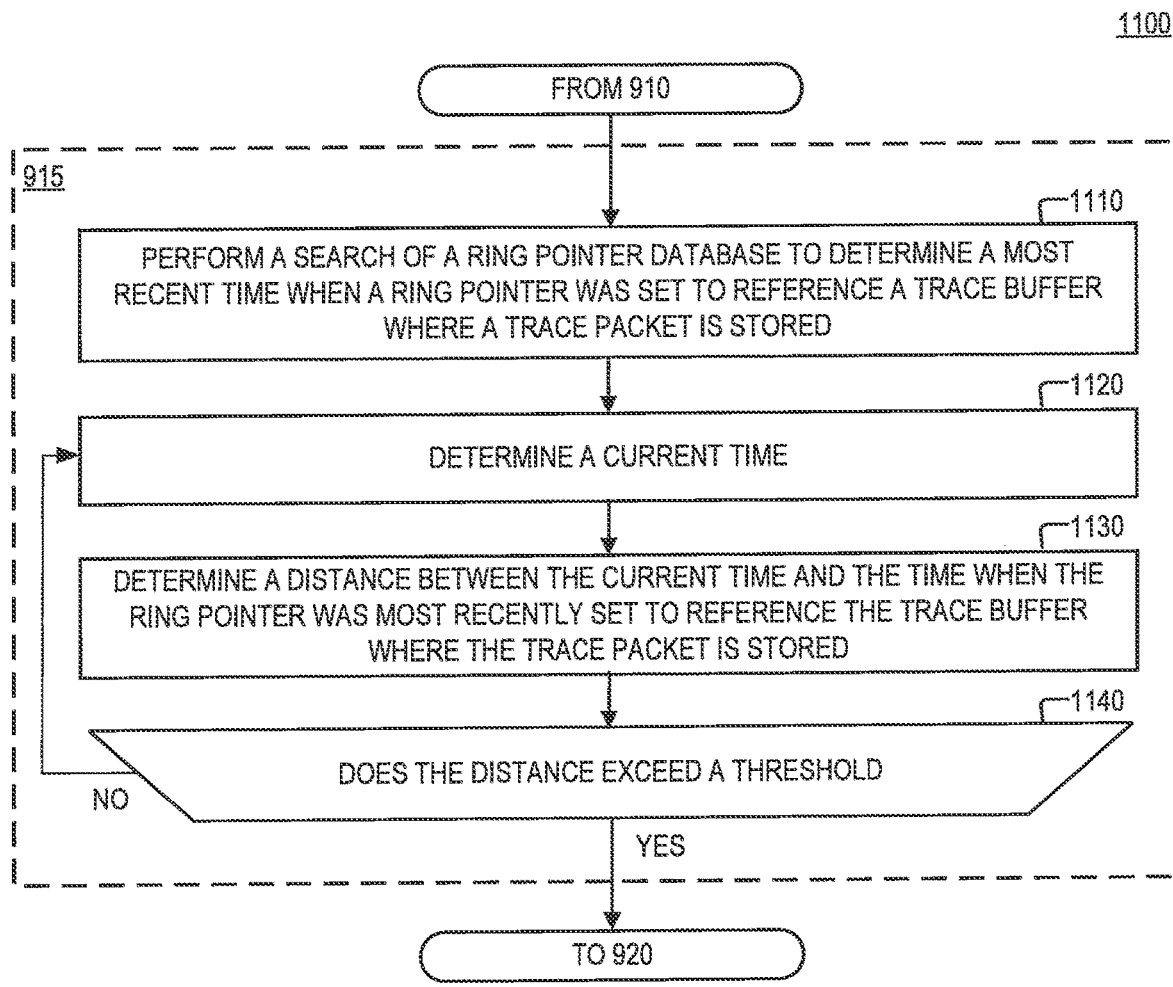
FIG. 11 is a flowchart of an example of a sub-process associated with the process of FIG. 9, according to aspects of the disclosure.

FIG. 11 is a flowchart of an example of a process 1100 for determinizing whether a condition for retrieving a trace packet from a trace buffer is satisfied, as specified by step 915 of the process 900. In the example of FIG. 11, the predetermined condition is satisfied when a second waiting period has passed following the most recent time a ring pointer was set to reference the trace buffer where the trace packet is stored. At step 1110, a search is performed of a ring pointer database to identify the most recent time when the ring pointer was assigned a value that indicates the address of the trace buffer where a trace packet to be retrieved is stored. As noted above, the search may be performed by using an identifier of the trace point that generated the trace packet and/or any other suitable information. At step 1120, a current time is determined. At step 1130, a distance is determined between the current time and the most recent time when the ring buffer was set to a value that indicates the address of the trace buffer where the trace packet is stored. At step 1140, a determination is made whether the distance exceeds a threshold. If the distance exceeds the threshold, the process 1100 proceeds to step 920 of the process 900. If the distance does not exceed the threshold, the process 1100 returns to step 1120.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application, the word "database" shall refer to a file, a relational database, a data structure, a plurality of data structure, a file system directory, and/or any other suitable device for storing information on a computing device. As used in this application, the phrase "database record" shall refer to any portion of a database. For example, when a database is implemented as a text file, a record in the database may be a line from the file or two or more words from the file that are separated by commas or another delimiter. As yet another example, when the database is implemented as a file system folder, a record in the database may be a file (or portion thereof) that is stored in file system directory. As yet another example, when the database is implemented as a plurality of objects, a record in the database may be one of the objects or a portion thereof. Although in example of FIG. 9 only one of the conditions defined by the process 1000 and 1100 needs to be satisfied in order for a trace data packet to be retrieved from the ring buffer, it will be understood that alternative implementations are possible in which both conditions are required to be satisfied before the trace data packet is retrieved.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for collecting trace data items generated by a plurality of trace points, the method comprising:
    allocating a ring buffer in a first memory device, the ring buffer including a plurality of trace buffers;
    incrementing a ring pointer to assign a given value to the ring pointer;
    when any of the trace points is executed, storing a trace data item generated by the trace point in one of the plurality of trace buffers that is identified by the given value of the ring pointer;
    retrieving the trace data item from the trace buffer based on a timestamp indicating a time when the ring pointer was assigned the given value, wherein retrieving the trace data item based on the timestamp includes: performing a search of a ring pointer database based on the given value to identify a timestamp corresponding to a most recent time when the ring pointer was assigned the given value, retrieving the timestamp as a result of the search, detecting a distance between a current time and a time indicated by the timestamp, detecting whether the distance exceeds a threshold, and retrieving the trace data item only when the distance exceeds the threshold; and
    storing the retrieved trace data item in a second memory device.

2. The method of claim 1, wherein the plurality of trace points is contained in one or more files, the method further comprising:
    pre-processing the one or more files before any of the trace points is executed to identify a size of a largest trace data item that is generated by any of the trace points,
    wherein the ring buffer is allocated based on the size of the largest trace data item that is generated by any of the trace points, such that each trace buffer in the ring buffer has a respective size that is greater than or equal to the size of the largest trace data item that is generated by any of the trace points.

3. The method of claim 1, wherein the plurality of trace points is contained in one or more files, the method further comprising:
    pre-processing the one or more files before any of the trace points is executed to identify a respective format of each of the trace data items, and, for each trace point, inserting one or more processor-executable instructions into a file containing the trace point, which when executed cause a format ID to be included into the trace data item, or other data, that is generated by the trace point, the format ID identifying the format of the trace data item that is generated by the trace point.

4. A method for collecting trace data items generated by a plurality of trace points, the method comprising:
    allocating a ring buffer in a first memory device, the ring buffer including a plurality of trace buffers;
    when any of the trace points is executed, storing a trace data item generated by the trace point in one of the plurality of trace buffers that is identified by a given value of a ring pointer;
    retrieving the trace data item from the trace buffer based on at least one of: (i) a first timestamp that is generated when the trace data item is stored in the trace buffer, and (ii) a second timestamp indicating a time when the ring pointer was assigned the given value;
detecting a first value of the ring pointer that is current when the retrieving of the trace data item is initiated;
detecting a second value of the ring pointer that is current when the retrieving of the trace data item is completed;
detecting whether the ring pointer has been re-assigned the given value before the retrieving of the trace data item is completed, the detecting being based on the first value of the ring pointer and the second value of the ring pointer; and
storing the retrieved trace data item in a second memory device, wherein the retrieved trace data item is stored in the second memory device only when the ring pointer has not been re-assigned the given value before the retrieving of the trace data item is completed.

5. An apparatus for collecting trace data items generated by a plurality of trace points, the apparatus comprising:
a first memory device;
a second memory device; and
at least one processor operatively coupled to the first memory device and the second memory device, the at least one processor being configured to:
allocate a ring buffer on the first memory device, the ring buffer including a plurality of trace buffers;
assign a given value to a ring pointer by incrementing the ring pointer,
when any of the trace points is executed, store a trace data item generated by the trace point in one of the plurality of trace buffers that is identified by the given value of the ring pointer;
retrieve the trace data item from the trace buffer based on a timestamp indicating a time when the ring pointer was assigned the given value, wherein the retrieval of the trace data item based on the timestamp includes: performing a search of a ring pointer database based on the given value to identify a timestamp corresponding to a most recent time when the ring pointer was assigned the given value, retrieving the timestamp as a result of the search, detecting a distance between a current time and a time indicated by the timestamp, detecting whether the distance exceeds a threshold, and retrieve the trace data item only when the distance exceeds the threshold; and
store the retrieved trace data item on the second memory device.

6. The apparatus of claim 5, wherein the plurality of trace points is contained in one or more files, and the at least one processor is further configured to:
pre-process the one or more files before any of the trace points is executed to identify a size of a largest trace data item that is generated by any of the trace points, wherein the ring buffer is allocated based on the size of the largest trace data item that is generated by any of the trace points, such that each trace buffer in the ring buffer has a respective size that is greater than or equal to the size of the largest trace data item that is generated by any of the trace points.

7. The apparatus of claim 5, wherein the plurality of trace points is contained in one or more files, and the at least one processor is further configured to:
pre-process the one or more files before any of the trace points is executed to identify a respective format of each of the trace data items, and for each trace point, insert one or more processor-executable instructions into a file containing the trace point, which when executed cause a format ID to be included into the trace data item, or other data, that is generated by the trace point, the format ID identifying the format of the trace data item that is generated by the trace point.

8. An apparatus for collecting trace data items generated by a plurality of trace points, the apparatus comprising:
a first memory device;
a second memory device; and
at least one processor operatively coupled to the first memory device and the second memory device, the at least one processor being configured to:
allocate a ring buffer on the first memory device, the ring buffer including a plurality of trace buffers;
when any of the trace points is executed, store a trace data item generated by the trace point in one of the plurality of trace buffers that is identified by a given value of a ring pointer;
retrieve the trace data item from the trace buffer based on at least one of: (i) a first timestamp that is generated when the trace data item is stored in the trace buffer, and (ii) a second timestamp indicating a time when the ring pointer was assigned the given value;
detect a first value of the ring pointer that is current when the retrieval of the trace data item is initiated;
detect a second value of the ring pointer that is current when the retrieval of the trace data item is completed;
detect whether the ring pointer has been re-assigned the given value before the retrieval of the trace data item is completed, the detection being based on the first value of the ring pointer and the second value of the ring pointer; and
store the retrieved trace data item on the second memory device, the retrieved trace data item being stored in permanent storage only when the ring pointer has not been re-assigned the given value before the retrieval of the trace data item is completed.

* * * * *